Dec. 15, 1959     F. G. REUTER ET AL     2,917,347
CUSHION FOR ENDLESS TRACKS
Filed Feb. 21, 1958
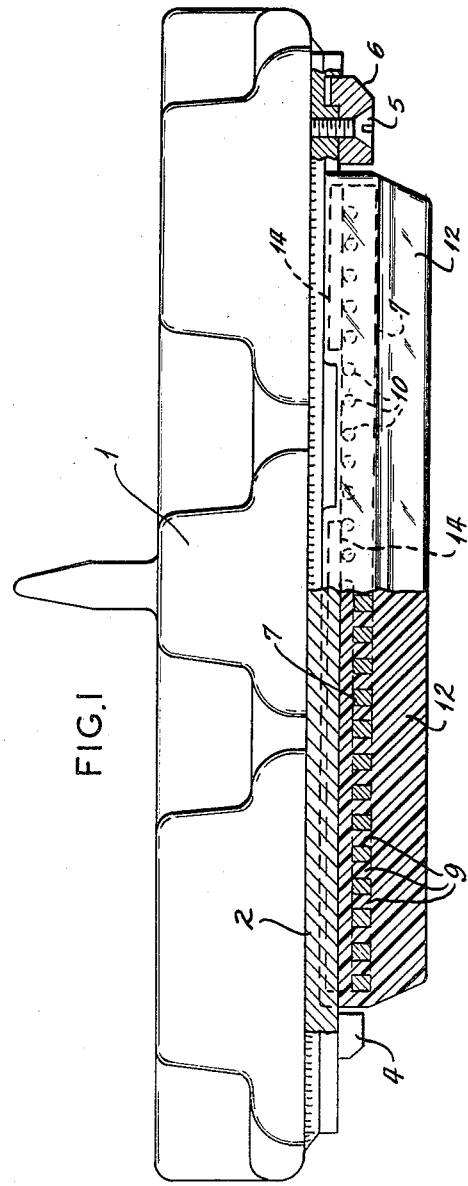
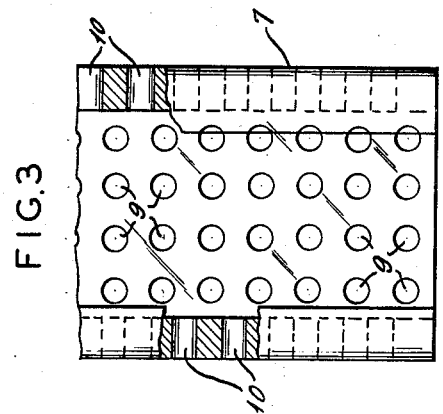
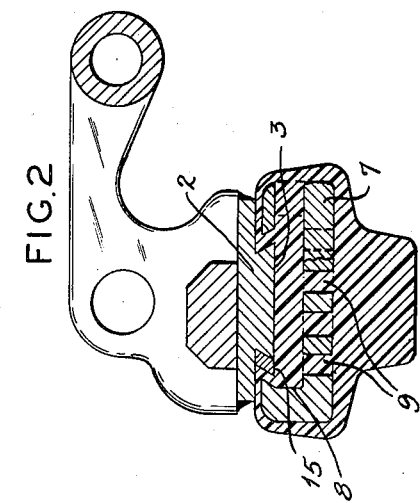

United States Patent Office 2,917,347
Patented Dec. 15, 1959

2,917,347

CUSHION FOR ENDLESS TRACKS

Franz Gottfried Reuter and Jürgen Ulderup, Lemforde, Hannover, and Ernst Kniepkamp, Heilbronn (Neckar), Germany, assignors, by mesne assignments, to Mobay Chemical Company, Pittsburgh, Pa., a corporation of Delaware Application February 21, 1958, Serial No. 716,714

Claims priority, application Germany February 23, 1957

5 Claims. (Cl. 305—38)

This invention relates generally to tracks for tractors and the like and, more particularly, to a novel track having an improved flexible cushioning means.

Ordinarily, endless tractor tracks are made from sheet metal properly shaped by cold working processes. The die-formed metal track is covered with rubber such as by vulcanizing or other means to provide a cushion. Such cushions are not entirely satisfactory for heavy tractors or similar equipment, however, particularly if high track velocities are involved because of excessive wear of the part.

It is therefore an object of this invention to provide a novel and improved tractor track. Still another object of the invention is to provide an endless track which has an improved structural design and is provided with a cushion having improved wearing characteristics.

Other objects will become apparent from the following description with reference to the accompanying drawing, in which Figure 1 is a side elevation of an endless track having the novel cushion provided by this invention;

Figure 2 is a cross section of an endless track; and

Figure 3 is a fragmentary plan view of an embodiment of a reinforcing means for a cushion of an endless track.

Generally speaking, the foregoing objects and others are accomplished in accordance with this invention by providing a track for tractors and the like having a reinforced substantially non-porous rubber-like polyurethane plastic cushion secured to the endless track. More specifically, the invention provides an endless track having a bar secured thereto which has a dove-tailed groove and a cushioning means adapted to fit about this dove-tailed groove to secure it to the bar on the endless track. Embedded in the cushion is a shaped metallic cushion support which has been formed from a suitable light weight alloy. This light weight alloy may be any suitable alloy but it is preferably aluminum.

The cushion provided by this invention may be formed from any suitable polyurethane plastic which is substantially non-porous and has rubber-like characteristics. Preferably, the polyurethane must have a Shore A hardness of from about 70° to about 95° and an elasticity of from about 25% to about 45%. Such a polyurethane plastic may be formed in accordance with standard known procedures for making rubber-like substantially non-porous polyurethanes, such as, for example, the procedures disclosed in U.S. Patents 2,764,565, 2,620,516, 2,621,166, 2,729,618 and 2,778,810. Such a process involves mixing a suitable organic polyisocyanate with a suitable organic compound having hydrogen atoms reactive with —NCO groups of the isocyanate to form a urethane linkage and then curing the resulting product by means of a suitable cross-linking agent. Any of the various polyisocyanates disclosed in the aforesaid patents may be used, but it is preferred to use 1,5-naphthylene diisocyanate, 4,4'-diphenyl methane diisocyantate, paraphenylene diisocyanate and the like. The organic compound having the hydrogen atoms reactive with —NCO groups may be any suitable compound of this class, such as, for example, a polyester prepared by condensation of a dicarboxylic acid and a glycol, a polyalkylene ether glycol prepared by condensation of an alkylene oxide, such as, for example, ethylene, propylene or butylene oxide, a polythioether glycol prepared by condensation of a thioglycol or a polyester amide. Suitable compounds of these types are disclosed in the aforesaid patents.

Any suitable apparatus may be used to prepare the polyurethane, but it is preferred to use the apparatus and process disclosed in U.S. Patent 2,764,565.

In fabricating the cushion it is sometimes advantageous to provide an especially thick layer of polyurethane between the cushion support and the link of the track. Such a cushion reduces the noise and assures a tight fit between the cushion support plate and the track link. In a preferred embodiment of the invention, the polyurethane used in filling the cushion support is more resilient than the remainder of the cushion.

Referring now to the drawing for a detailed description of an embodiment of the invention, an endless track is shown in a side elevation in Figure 1. The cushion or grouser 12 is shown partially in cross section. Track 1 has a bar 2 mounted on the tread thereof. Bar 2 is secured to the track by having a projection embedded into the track. Bar 2 carries a dove-tailed tongue 3 on its exposed surface. Bar 2 is provided with an integral stop 4 and a detachable slide holder 6 held in place by bolt 5.

A cushion support 7 is embedded in cushion 12. The cushion support may be made from any suitable light alloy, but it is preferably made from aluminum. Cushion support 7 is provided with a dove-tailed groove 8 such as shown in Figure 2 and has a plurality of holes 9 therein. Support 7 also has holes 10 directed inwardly in a direction opposite to the longitudinal axis of holes 9. Dove-tailed groove 8 forms a slidable fit about dove-tailed tongue 3, thereby locking the cushion to the track.

A cast rubber-like polyurethane plastic cushion 12 surrounds support 7 and extends into holes 9 and 10, thereby securely locking support 7 therein. The polyurethane cushion 12 is relatively thick and is expanded, thereby transmitting the load from the link of the track to the road surface. Cushion support 7 is provided with a dove-tailed groove 8 having therein a layer of polyurethane which rests against the face of dove-tailed tongue 3 when the support has been slid over the dove-tailed tongue. Additional shims 15 may be used in several places, for instance at 14 in Figure 1, to locate the cushion support on the bar 2, thereby eliminating the requirement of close tolerances. The cushion 12 may be replaced by merely loosening the bolt 5, detaching the side stop 6, removing shims 15 for sliding the cushion support off the track by moving it longitudinally with respect to the tongue groove. It is thus apparent that the cushion 12 is attached to the bar 2 by sliding it over dove-tailed tongue 3.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A link for an endless track having a tread and a rubber-like substantially non-porous polyurethane plastic cushion secured to said tread, a metallic support imbedded in said cushion having a plurality of perforations therein through which said polyurethane extends, said cushion being fastened to said tread by means of a dove-tailed joint.

2. The link of claim 1 wherein said support is a light alloy metal plate.

3. The link of claim 1 wherein said link is provided with a slide stop and a detachable slide holder to prevent movement of said cushion with respect to said tread.

4. The link of claim 1 wherein shims are provided between the male and female portions of the dove-tailed joint.

5. The link of claim 1 wherein the said polyurethane has a Shore A hardness of from about 70° to about 95° and an elasticity of from about 25 percent to about 45 percent.

References Cited in the file of this patent

UNITED STATES PATENTS

| | | |
|---|---|---|
| 627,274 | Selleck | June 20, 1899 |
| 1,370,663 | Moun | Mar. 8, 1921 |
| 1,863,481 | Hurlimann | June 14, 1932 |
| 1,886,839 | Scheckel | Nov. 8, 1932 |
| 2,332,313 | Galanot | Oct. 19, 1943 |
| 2,755,146 | Galanot | July 17, 1956 |